(12) United States Patent
Sivanesan et al.

(10) Patent No.: US 8,929,245 B2
(45) Date of Patent: Jan. 6, 2015

(54) COMMUNICATING A FEEDBACK DATA STRUCTURE CONTAINING INFORMATION IDENTIFYING CODING TO BE APPLIED ON WIRELESSLY COMMUNICATED SIGNALING

(71) Applicant: Apple Inc., Cupertino, CA (US)

(72) Inventors: Kathiravetpillai Sivanesan, Richardson, TX (US); Peiying Zhu, Kanata (CA); Sang-Youb Kim, Plano, TX (US); Lai King Tee, San Diego, CA (US); Junfeng Xiao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/971,975

(22) Filed: Aug. 21, 2013

(65) Prior Publication Data

US 2013/0336416 A1    Dec. 19, 2013

Related U.S. Application Data

(63) Continuation of application No. 12/919,840, filed as application No. PCT/US2009/035561 on Feb. 27, 2009, now Pat. No. 8,531,958.

(60) Provisional application No. 61/032,351, filed on Feb. 28, 2008, provisional application No. 61/032,352, filed on Feb. 28, 2008, provisional application No. 61/045,502, filed on Apr. 16, 2008.

(51) Int. Cl.
*H04B 7/24* (2006.01)
(Continued)

(52) U.S. Cl.
CPC ............ *H04B 7/0456* (2013.01); *H04B 7/0632* (2013.01); *H04L 25/0204* (2013.01); *H04L 25/03343* (2013.01);
(Continued)

(58) Field of Classification Search
None
See application file for complete search history.

(56) References Cited

U.S. PATENT DOCUMENTS

2006/0270360 A1    11/2006    Han
2007/0025345 A1    2/2007    Bachl et al.
(Continued)

FOREIGN PATENT DOCUMENTS

CN    1770677        5/2006
CN    1780173 A      5/2006
(Continued)

OTHER PUBLICATIONS

Ericsson, "Contents of CQI reports", Jun. 25-29, 2007, R1-073057, 3GPP TSG RAN WG1 Meeting #49bis, pp. 1-3.*

(Continued)

*Primary Examiner* — Omar Ghowrwal
(74) *Attorney, Agent, or Firm* — Meyertons, Hood, Kivlin, Kowert & Goetzel, P.C.

(57) ABSTRACT

To perform wireless communications in a closed loop multiple input, multiple output (MIMO) system, a feedback data structure is communicated over a wireless channel between a first wireless node and a second wireless node, where the feedback data structure contains indicators identifying coding to be applied by the second wireless node on signaling communicated between the second wireless node and the first wireless node, where the information in the feedback data structure is based on wireless channel conditions detected at the first wireless node. The indicators identify different codings to be used for different corresponding bands in the wireless channel.

32 Claims, 5 Drawing Sheets (51) Int. Cl.
*H04B 17/00* (2006.01)
*H04W 24/00* (2009.01)
*H04W 88/02* (2009.01)
*H04W 88/08* (2009.01)
*H04W 40/00* (2009.01)
*H04B 7/06* (2006.01)
*H04B 7/04* (2006.01)
*H04L 25/03* (2006.01)
*H04L 25/02* (2006.01)

(52) U.S. Cl.
CPC ... *H04L 2025/03802* (2013.01); *H04B 7/0639* (2013.01); *H04B 7/063* (2013.01); *H04L 2025/03426* (2013.01); *H04B 7/0417* (2013.01); *H04L 2025/03414* (2013.01)
USPC ............ 370/252; 370/343; 370/351; 370/480

(56) References Cited

U.S. PATENT DOCUMENTS

| | | |
|---|---|---|
| 2007/0230373 A1 | 10/2007 | Li |
| 2007/0253386 A1 | 11/2007 | Li |
| 2008/0043677 A1 | 2/2008 | Kim et al. |
| 2008/0132281 A1 | 6/2008 | Kim et al. |
| 2008/0137577 A1 | 6/2008 | Habetha |
| 2009/0080549 A1 | 3/2009 | Khan et al. |
| 2009/0086648 A1* | 4/2009 | Xu et al. ............... 370/252 |
| 2010/0208839 A1 | 8/2010 | Walton et al. |
| 2010/0222008 A1 | 9/2010 | Astely et al. |
| 2011/0007633 A1 | 1/2011 | Takano et al. |
| 2011/0069778 A1 | 3/2011 | Kim |
| 2012/0069925 A1 | 3/2012 | Mondal et al. |
| 2012/0076032 A1* | 3/2012 | Mundarath et al. ........ 370/252 |

FOREIGN PATENT DOCUMENTS

| | | |
|---|---|---|
| CN | 101039137 | 9/2007 |
| EP | 1890413 | 2/2008 |
| KR | 2003-0007481 A | 1/2003 |
| KR | 2004-0089748 A | 10/2004 |
| KR | 2005-0020576 A | 3/2005 |
| KR | 2007-0043880 A | 4/2007 |
| WO | 2006/051372 A1 | 5/2006 |
| WO | 2006/138337 | 12/2006 |
| WO | 2007/050924 A1 | 5/2007 |
| WO | 2007/112371 A1 | 10/2007 |
| WO | 2007122727 | 11/2007 |

OTHER PUBLICATIONS

Draft ETSI EN 301 707 V7.4.0 (Jun. 2000) European Standard (Telecommunications series) Digital cellular telecommunication system (Phase 2+); Discontinuous Transmission (DTX) for Adaptive Multi-Rate (AMR) speech traffic channels (GSM 06.93 version 7.4.0 Release 1998), pp. 1-15.*
cdma2000 Access Entry, Access and Access Probe Handoff features, Ericsson and Motorola, UTRA L123 Hooks and Extensions Workshop, Aug. 1999, pp. 1.*
Physical Layer Standard for cdma2000 Spread Spectrum Systems Revision D, 3GPP2, Feb. 13, 2004. pp. 1-50.*
IEEE Std 802.16.2-2004, IEEE Computer Society, pp. 1-171.*
Post Processing SINR Calculation based on Midamble for band AMC, Kathiravetpillai et al. Mar. 19, 2008, pp. 1-3.*
NTT DoCoMo, On CQI Reporting in E-UTRA,3GPP R1-074819,Jan. 9, 2007, pp. 1-4.
NTT DoCoMo et al., Basic Method for CQI Feedback in E-UTRA,3GPP R1-073701,Aug. 24, 2007, pp. 1-4.
NTT DoCoMo, on CQI Reporting in E-UTRA,3GPP R1-074289, Oct. 12, 2007, pp. 1-4.
Nortel, Uplink Signaling Support for DL Rank Adaptation with Fixed Precoding,3GPP R1-073291, Aug. 24 2007, pp. 1-4.
LG Electronics, Separate transmission of CQI values and indexes considering reporting period, 3GPP R1-073490, Aug. 24, 2007, pp. 1-5.
Ericsson, Contents of CQI reports,3GPP R1-073057,Jun. 29, 2007, pp. 1-3.
Ericsson, Channel feedback format selection,3GPP R1-074854,Nov. 9, 2007, pp. 1-6.
NTT DoCoMo et al., AMC and HARQ Using Frequency Domain Channel Dependent Scheduling in MIMO Channel Transmission, 3GPP R1-050942, Sep. 2, 2005, pp. 1-8.
Office Action from Japanese Patent Application No. 2010-548919, mailed Jul. 22, 2013, (English Translation and Japanese Versions), pp. 1-13.
Office Action and translation thereof in JP Application No. 2010-548919, Feb. 28, 2013, pp. 1-6.
"Downlink Control Signaling for MU-MIMO;" InterDigital Communications, LLC, 3GPP TSG RAN WG1 Meeting #52, R1-080777, Sorrento, Italy, Feb. 11-15, 2008; pp. 1-4.
Wang et al.; "WiMAX Overview and System Performance," Vehicular Technology Conference (VTC), Sep. 2006, 64th IEEE; pp. 1-6.
"Analysis on OCT based CQI reporting Scheme (resubmission of RI-062954);" LG Electronics, 3GPP TSG RAN WG1 #47, R1-063174, Riga, Latvia, Nov. 6-10, 2006; pp. 1-14.
"PUCCH (CQI) Structure and Multiplexing;" Qualcomm Europe, 3GPP TSG RAN WG1 #49, R1-072036, Mar. 7-11, 2007, Cobe, Japan; pp. 1-10.
"Scheduling requests using CQI;" Qualcomm Europe, 3GPP TSG-RAN WG1 #49, R1-072731, Orlando, FL, Jun. 25-29, 2007; pp. 1-3.
"RACH procedure;" Qualcomm Europe, 3GPP TSG-RAN WG2 #56bis, R2-070212, Sorrento, Italy, Jan. 15-19, 2007; pp. 1-4.
First Office Action in Chinese Application No. 200980106749.1, issued Dec. 4, 2012, pp. 1-17.
"UMTS Long Term Evolution (LTE) Technology Introduction" C. Gessner Sep. 2008, pp. 1-55.
"3rd Generation Partnership Project; Technical Specification Group Radio Access Network, Physical Layer Procedures (Release 8)" 3GPP 2006 pp. 1-11.
"3rd Generation Partnership Project; Technical Specification Group Radio Access Network; Evolved Universal Terrestrial Radio Access (E-UTRA) Physical Layer Procedures" 3GPP 2007, pp. 1-17.
Extended European Search Report in Application No. 09714555.1, dated Nov. 7, 2013, pp. 1-10.
IEEE Transactions on Information Theory, "On Beamforming with Finite Rate Feedback in Multiple-Antenna Systems", Krishna Kiran Mukkavilli, et al., pp. 2562-2579, Oct. 2003.

* cited by examiner

COMMUNICATING A FEEDBACK DATA STRUCTURE CONTAINING INFORMATION IDENTIFYING CODING TO BE APPLIED ON WIRELESSLY COMMUNICATED SIGNALING

PRIORITY INFORMATION

This application is a continuation of U.S. patent application Ser. No. 12/919,840, filed Aug. 27, 2010, entitled "Communicating a Feedback Data Structure Containing Information Identifying Coding to be Applied on Wirelessly Communicated Signaling", which is a National Stage Entry of International Application No. PCT/US09/35561, filed Feb. 27, 2009, which claims the benefit of priority to:

U.S. Provisional Application No. 61/032,351, filed Feb. 28, 2008,

U.S. Provisional Application No. 61/032,352, filed Feb. 28, 2008, and

U.S. Provisional Application No. 61/045,502, filed Apr. 16, 2008.

TECHNICAL FIELD

The invention relates generally to communicating a feedback data structure containing information identifying coding to be applied on wirelessly transmitted signaling.

BACKGROUND

Various wireless access technologies have been proposed or implemented to enable mobile stations to communicate with other mobile stations or with wired terminals coupled to wired networks. Examples of wireless access technologies include GSM (Global System for Mobile communications) or UMTS (Universal Mobile Telecommunications System) technologies, defined by the Third Generation Partnership Project (3GPP); CDMA 2000 (Code Division Multiple Access 2000) technologies, defined by 3GPP2; or other wireless access technologies.

Another type of wireless access technology is the WiMAX (Worldwide Interoperability for Microwave Access) technology. WiMAX is based on the IEEE (Institute of Electrical and Electronics Engineers) 802.16 standards. The WiMAX wireless access technology is designed to provide wireless broadband access.

One of the features provided by the WiMAX technology is support for MIMO (multiple input, multiple output). MIMO refers to use of multiple antennas at the transmit site and at the receive site, such that data can be transmitted from multiple antennas of a transmitter over multiple paths for receipt by antennas of a receiver. Usage of the MIMO technology enhances capacity, scalability, and flexibility of wireless networks. By using the MIMO technology, multiple parallel channels (in the form of multiple spatial beams or streams) can be provided to achieve increased capacity.

Closed loop MIMO (CL-MIMO) refers to a MIMO mode that uses information about the transmission channel that is fed back from the mobile station to a serving base station, where the base station uses the feedback information to select resources for use in wireless communications between the base station and the mobile station and to compensate for effects of the transmission channel. Conventionally, efficient feedback mechanisms have not been provided to enable closed loop MIMO operations.

SUMMARY

In general, according to a preferred embodiment, a method of wireless communication in a closed loop multiple input, multiple output (MIMO) system includes communicating, over a wireless channel between a first wireless node and a second wireless node, a feedback data structure containing information identifying coding to be applied on signaling communicated wirelessly between the second wireless node and the first wireless node.

Other or alternative features will become apparent from the following description, from the drawings, and from the claims.

DETAILED DESCRIPTION

In accordance with preferred embodiments, an improved feedback mechanism is provided to allow a mobile station to send feedback information in a feedback data structure to the serving base station, where the feedback information identifies coding to be applied by the base station on downlink signaling (traffic data and/or control signaling and/or reference signal) transmitted by the base station over a wireless channel to the mobile station. The feedback information contained in the feedback data structure is based on detected wireless channel conditions at the mobile station. The feedback information includes at least an indicator that is used to select coding to be applied on signaling wirelessly communicated between the base station and mobile station. As explained in further detail below, this indicator includes a precoding matrix index (PMI) in some embodiments that is used to apply precoding. Other feedback information can include a channel quality indicator (CQI) and rank information. Coding based on CQI can include selection of the coding and modulation scheme, while coding based on rank information refers to selection of a number of data streams.

The feedback data structure according to some preferred embodiments also allows for identification of the M (M>1) best bands of the wireless channel (e.g., the M best bands based on detected channel conditions). Since M bands are identified in the feedback data structure, M indicators, such as M PMI values, corresponding to the M bands are provided in the feedback data structure. Once the base station obtains the feedback data structure, the base station can select one or more of the M best bands to use for communicating data between the base station and mobile station.

A "base station" refers to any node that is able to communicate wirelessly with one or more mobile stations within a cell or cell sector. In some embodiments, the base station is according to WiMAX (Worldwide Interoperability for Microwave Access), as defined by the IEEE (Institute of Electrical and Electronics Engineers) 802.16 specifications. Although reference is made to WiMAX in the preferred embodiments, it is noted that the same or similar techniques can be applied to other technologies, including UMTS (Universal Mobile Telecommunications System) technologies as defined by the Third Generation Partnership Project (3GPP), and the CDMA 2000 (Code Division Multiple Access 2000) technology, as defined by 3GPP2. Reference to UMTS covers the Long-Term Evolution (LTE) technology.

A wireless channel between a base station and a mobile station refers to a collection of resources (one or more carriers of different frequencies, one or more time slots, etc.). In the WiMAX context, a wireless channel includes a collection of sub-carriers (of different frequencies) in the frequency dimension and time slots in the time dimension. A wireless channel can include multiple bands (described further below).

Although reference is made to various exemplary wireless access technologies, it is noted that techniques according to some embodiments can also be applied to other types of wireless access technologies.

Figure 1:
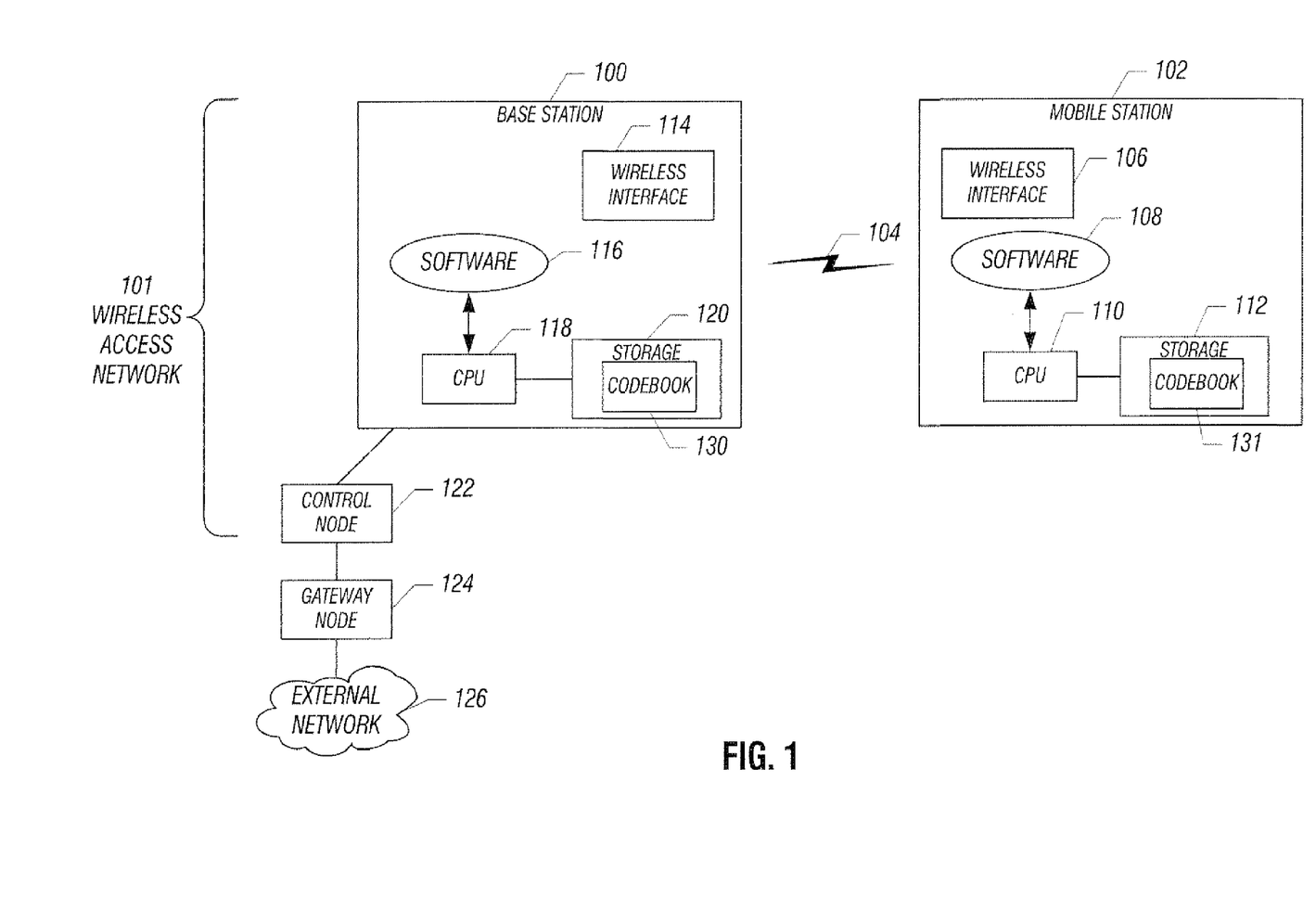
FIG. 1 is a block diagram of an exemplary arrangement that includes a preferred embodiment of the invention.

FIG. 1 illustrates an exemplary wireless access network 101 that includes a base station 100 that is able to wirelessly communicate with a mobile station 102 over a wireless channel 104. The base station 100 can be a WiMAX base station or another type of base station.

The mobile station 102 includes a wireless interface 106 to communicate wirelessly over the wireless channel 104. The mobile station 106 also includes software 108 that is executable on one or more central processing units (CPUs) 110 to perform various tasks associated with a mobile station 102. The CPUs 110 is (are) connected to a storage 112 to store data and software instructions.

Similarly, the base station 100 includes a wireless interface 114 to communicate wirelessly over the wireless channel 104. The base station 100 also includes software 116 executable on one or more CPUs 118 in the base station 100, which is (are) connected to a storage 120 to store data and software instructions. The storage 120 also includes a codebook 130 that includes various entries containing corresponding precoding matrices for applying precoding on downlink signaling communicated between the base station 100 and the mobile station 102. Note that the storage 112 of the mobile station 102 also contains a codebook 131 that is the same as codebook 130.

Although just one base station 100 and mobile station 102 are depicted in FIG. 1, it is noted that a typical wireless access network would include multiple base stations for communication with multiple mobile stations located within a respective cell or cell sector.

The wireless access network 101 also includes a control node 122 to which the base station 100 is connected. The control node 122 can be a system controller such as an access service network (ASN) gateway in the WiMAX context. The control node 122 is in turn connected to a gateway node 124, which connects the wireless access network to an external network 126, such as the Internet. The gateway node 110 can be a connectivity service network (CSN) node in the WiMAX context.

According to some preferred embodiments, the wireless access network 101 depicted in FIG. 1 provides codebook-based closed loop MIMO (CL-MIMO) operations, in which feedback information is provided from the mobile station 102 to the base station 100 to allow the base station 100 to apply a selected precoding to downlink signaling communicated between the base station and the mobile station. Although reference is made to applying codebook-based precoding to downlink signaling, note that codebook-based precoding can also be applied to uplink signaling transmitted wirelessly from the mobile station 102 to the base station 100. Techniques according to preferred embodiments are also applicable to precoding of uplink signaling.

Figure 2:
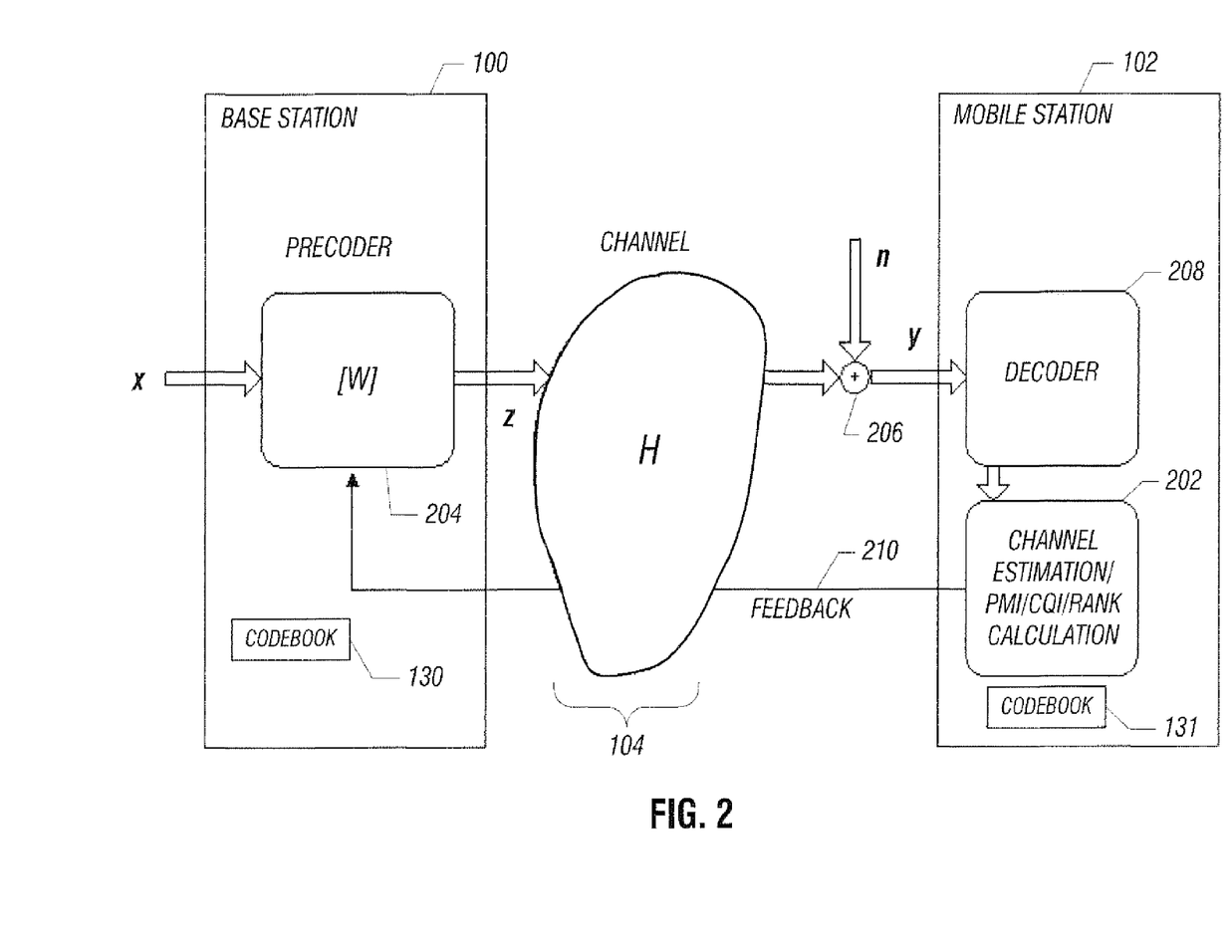
FIG. 2 is a schematic diagram illustrating feedback of information from a mobile station to a base station, where the information that is fed back includes a precoding matrix index (PMI), channel quality indicator (CQI), and rank information in a feedback header structure, according to a preferred embodiment.

A schematic diagram of components involved in a downlink CL-MIMO operation is depicted in FIG. 2. A wireless link is represented as H in FIG. 2, where H is a channel matrix (or transfer function) that affects a signal sent from the base station to the mobile station (on the downlink). In the mobile station 102, a block 202 represents tasks of the mobile station 102 relating to estimating channel capacities. In one implementation, based on the channel capacity estimation, the mobile station 102 calculates a PMI (precoding matrix index), a channel quality indicator (CQI), and a rank mode, which are fed back (at 210) in a feedback data structure in the uplink from the mobile station 102 to the base station 100. Other mechanisms of calculating PMI, CQI, and/or rank mode can be employed in other implementations.

The channel estimation performed by the mobile station is an estimation of the channel matrix H. The mobile station also has knowledge of the precoding matrices that are kept in the codebook 131 that is also stored as 130 in the base station 100. In one example, the channel estimation performed in block 202 is according to a submission by Kathiravetpillai Sivanesan et al., entitled "Post Processing SINR Calculation Based on Midamble for Band AMC," dated Mar. 19, 2008. In other examples, other types of channel estimation techniques can be used.

From the estimated channel matrix H, the mobile station is able to calculate channel capacity values for all available precoding matrices and MIMO modes (e.g., rank 1 and rank 2), and chooses the precoding matrix and the MIMO mode (rank) that gives the largest AWGN (additive white Gaussian noise) capacity value. Note that there can be additional rank modes in other implementations. If M best bands are selected, the respective precoding matrix and MIMO rank for each of the M best bands is selected. Each precoding matrix is associated with a respective PMI. The M best bands are identified based on respective AWGN capacities of the bands. Alternatively, the M best bands can be identified based on other criteria.

The CQIs for the respective M best bands are also calculated. Each CQI provides information regarding the quality of a respective band between the base station and mobile station.

The rank mode that can be used in some implementations includes rank 1 or rank 2. Note that the rank mode indicated by the mobile station in the feedback data structure can be overridden by the base station under certain conditions. Additional ranks can be used in other embodiments. "Rank 2" indicates that a particular wireless channel used to communicate data between a base station and a mobile station is able to use two layers such that two spatial beams can be used simultaneously to allow simultaneous transmission of data to the mobile station to double the frequent data communication. On the other hand, "rank 1" means that just a single layer can be used for the wireless channel, which means that just one of multiple spatial beams are used for transmitting data.

The codebook 130 that is stored at the base station 100 is arranged as a matrix having rows corresponding to multiple PMI values, and two columns corresponding to the two possible ranks (1, 2). Each PMI value that is fed back from the mobile station 102 to the base station 100 indexes to a row in the codebook 130, while each corresponding rank mode selects one of the two columns of the codebook 130. Together, a pair of a PMI value and the rank mode selects one of the entries of the codebook 130, from which a corresponding precoding matrix is extracted. The selected precoding matrix is represented as "W" in FIG. 2.

The selected precoding matrix W is applied by a precoder 204 to an input signal (x) in the base station 100. The precoded signal is transmitted as signal z from the base station 100. The transmitted signal z is communicated over the wireless channel (represented by H), which is combined (at 206) with noise (n) to provide received signal y at the mobile station 102. The received signal y is decoded by a decoder 208 in the mobile station 102 to extract the original signal x. The decoding performed by the decoder 208 involves reversing the precoding applied by the precoder 204 in the base station 100.

Feeding back the PMI, CQI, and rank information can be performed using a feedback header structure sent (at 210) on the uplink from the mobile station 102 to the base station 100. Use of the feedback data structure is relatively efficient since the feedback data structure can be provided with data frames sent from the mobile station 102 to the base station 100. "Providing" the feedback header structure with data frames includes inserting the feedback header structure into the data frames (header or body of data frames) or appending the feedback header structure to the data frames. Using the feedback data structure also provides enhanced flexibility, since a feedback data structure can be sent multiple times to ensure receipt by the base station.

Note that the base station is able to override any recommendation (PMI, CQI, and/or rank information) from the mobile station under certain conditions. If a PMI is overridden, then the base station can signal the different PMI to the mobile station.

The feedback header structure according to the WiMAX protocol includes multiple portions; in one embodiment, the multiple portions of the feedback header structure includes a feedback header of a first type and a feedback header of a second type. In one example, the two types of feedback headers are feedback header type 0110 and feedback header type 1101 according to the WiMAX standards. The feedback header type 0110 is sent less frequently than feedback header type 1101. In some implementations, feedback header type 1101 is sent with every data frame, whereas feedback header type 0110 is sent every N data frames, where N>1. In one example, N is equal to six.

A "frame" of data refers to some predefined collection of data bits (and control information) that can be exchanged over a wireless channel between a base station and a mobile station. In some cases, frames are concatenated into a superframe that is carried in the uplink or downlink. More generally, the feedback header structure has multiple portions, where a first portion is sent more frequently than at least a second portion of the feedback header structure.

Figure 3:
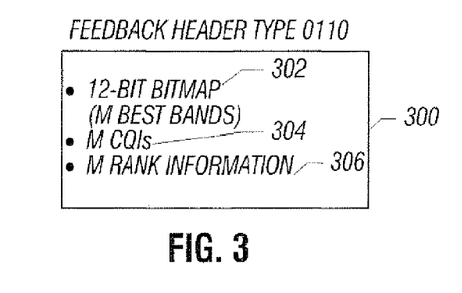
FIGS. 3 and 5 illustrate feedback headers used for communicating feedback information from a mobile station to a base station, according to some preferred embodiments.

FIG. 3 shows a portion of the content of a feedback header (300) of type 0110. The content of the feedback header 300 (of type 0110) contains a first element 302 that indicates the M best bands in the wireless channel between the base station and mobile station, where M>1. In one example implementation, the element 302 that identifies the M best bands is a bitmap, such as a 12-bit bitmap. In one example, M is equal to 3 (although other values can be used in other implementations).

Figure 4:
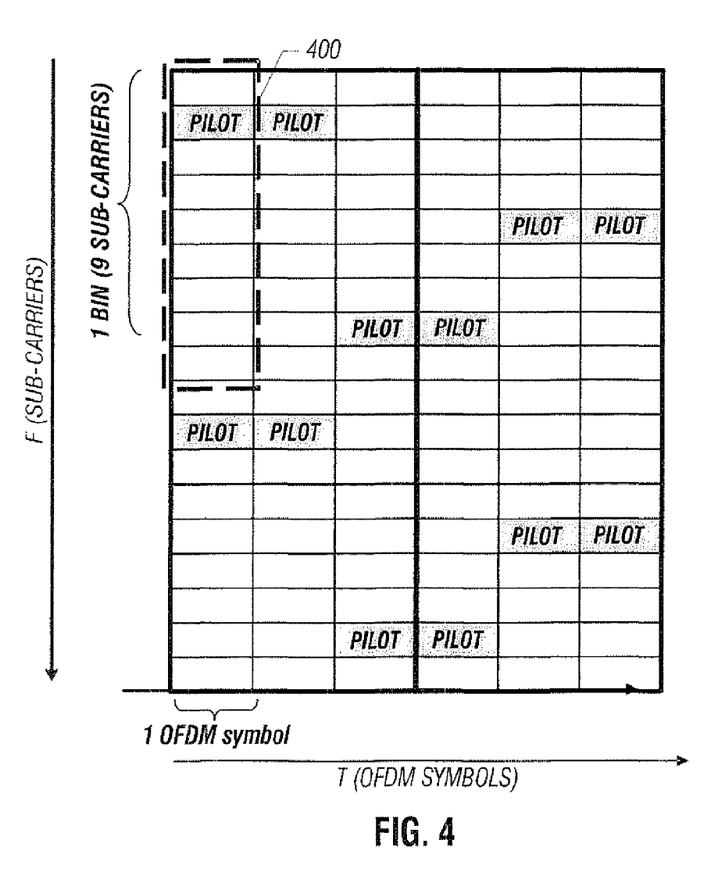
FIG. 4 illustrates an orthogonal frequency division multiplexing (OFDM) radio resource structure that is used by some preferred embodiments.

A "band" used in the WiMAX context refers to an AMC (adaptive modulation and coding) logical band that is formed of 8 bins (in the frequency domain) and all the downlink data OFDM (orthogonal frequency division multiplexing) symbols (in the time domain). According to OFDM, different users can be assigned different sets of sub-carriers (at different frequencies) and in different time slots (which includes a set of the OFDM symbols). In one implementation, a bin is defined as 9 consecutive sub-carriers of different corresponding frequencies. Such a bin is shown in FIG. 4 as bin 400. The bin 400 includes 9 sub-carriers and one OFDM symbol (in the time domain). An AMC logical band includes 8 bins 400 (along the frequency dimension) and all the OFDM symbols along the time dimension. In one implementation, there can be 12 bands in each wireless channel between the base station and mobile station.

More generally, a "band" refers to some predefined portion of a wireless radio resource, which can have multiple such predefined portions to use for communicating data between the base station and mobile station.

The feedback header 300 of FIG. 3 also includes element 304 containing CQIs for the M best bands. Thus, the element 304 includes a first CQI for the best band, a second CQI for the second best band, and a third CQI for the third best band. In one implementation, each CQI contains 5 bits, such that the number of bits to store the M CQIs is M×5.

Another element 306 of the feedback header 300 contains rank information, to identify the rank modes for the M bands. In other words, the rank mode for the best band, the rank mode for the next best band, and so forth, are included in the element 306. Each rank mode is represented as one bit (to indicate rank 1 or rank 2), such that the element 306 is made up of M bits.

Although specific numbers of bits are noted above for elements 302, 304, and 306 of the feedback header 300, these numbers are provided for purposes of example. In different implementations, different sizes of the elements 302, 304, and 306 can be employed. Moreover, the feedback header 300 also contains other information (not shown).

Figure 5:
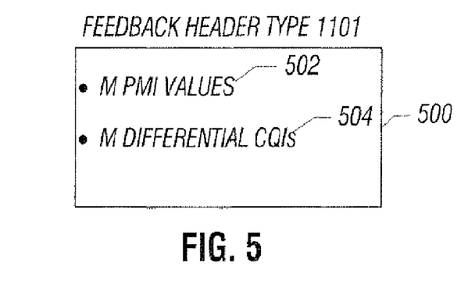

FIG. 5 shows a feedback header 500 according to type 1101. The feedback header 500 contains an element 502 containing the PMI values for the M best bands. If the PMI value is 3 bits in length, then the number of bits for element 502 is M×3. However, if the length of a PMI is 6 bits, then the number of bits of element 502 is M×6.

Another element 504 in the feedback header 500 includes the differential CQIs for the M best bands. A differential CQI is a shortened CQI (e.g., 2 bits instead of 5 bits) that indicates a difference between the CQI of the current frame and the CQI reported in feedback header 300. Note that the full CQI value is reported in the feedback header 300 that is sent less frequently than feedback header 500. The feedback header 300 may be sent every N frames. However, for each subsequent frame after the frame corresponding to feedback header 300, a CQI may have changed, such that the differential CQIs provided in the element 504 of the feedback header 500 provides an indication of the extent of such change, if any.

Instead of reporting the PMI and the differential CQI in the feedback header structure type 1101 as discussed above, the PMI, and differential CQI can alternatively be communicated in the CQICH (CQI channel) sent on the uplink. The CQICH includes a primary CQICH and a secondary CQICH. The primary CQICH is used to carry the PMI for the M best bands. There is just one PMI value for all M best bands. The secondary CQICH is used to carry the 1-bit differential CQI per band for the M best bands. The 1-bit differential CQI represents the difference between the CQI of the current data frame and the CQI reported in the feedback header 300. (Note that according to some embodiments, when the CQICH is selected for providing feedback information to the base station, the feedback header of type 0110 is still used; however, the feedback header of type 1101 is not used when CQICH is selected).

CQICH is a more reliable mechanism for communicating information from the mobile station to the base station, particularly for mobile stations that are located at the cell edge or located in locations of high obstruction or reduced signal quality.

Based on detected channel conditions, the base station can provide an indication to a mobile station regarding which mechanism to use to report the PMI and differential CQIs. Under relatively good channel conditions, the base station can instruct the mobile station to use the feedback header structure (type 1101) to report the PMI and differential CQI. The feedback header of type 1101 is able to communicate more information than the CQICH. For example, with the feedback header of type 1101, different PMI values can be provided for corresponding M best bands, whereas the CQICH is limited to providing just one PMI for the M best bands. Also, the CQICH is limited to using a 1-bit differential CQI instead of the 2-bit differential CQI that can be communicated in the feedback header of type 1101.

Figure 6:
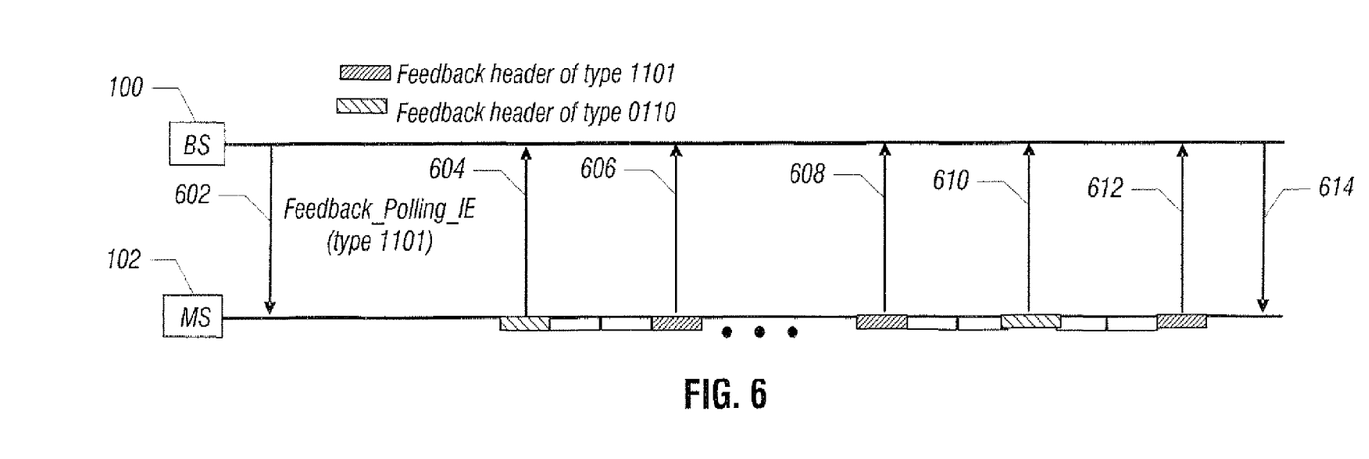
FIGS. 6-10 are message flow diagrams of message exchanges between a mobile station and base station, according to some preferred embodiments.

FIG. 6 shows an exemplary flow diagram of exchanges of messages between the base station and a mobile station. To enable the mobile station to send feedback information to the base station for performing CL-MIMO operation, the base station 100 sends (at 602) a polling information element, referred to as a Feedback_Polling_IE, to the mobile station 102. The Feedback_Polling_IE indicates the feedback header type, feedback periodicity and the duration of the feedback. The polling information element can be sent in a down link control channel. More generally, the base station is able to send some type of an indication that a feedback mechanism is to be activated.

The CL-MIMO operation could be started after the base station 100 issues two polling IEs for feedback types 0110 and 1101, respectively, or only one polling IE for type 1101. When the mobile station 102 receives only one polling IE for type 1101 it overrides the feedback header type to type 0110 in the first feedback, Nth feedback, 2Nth feedback and so on. When the feedback type is overridden to type 0110 in a particular frame, the PMI and differential CQI values will not be available. In that situation the PMI and differential CQIs received in the previous frame can be used. In response to receiving the Feedback_Polling_IEs for types 0110 and 1101, the mobile station begins to send the feedback headers of types 1101 and 0110. The mobile station 102 first sends the feedback header of type 0110 (at 604). Note that the feedback header of type 0110 is sent less frequently than the feedback header of type 1101. Following transmission of the feedback header of type 0110 (at 604), the mobile station sends (at 606, 608) feedback headers of type 1101, which can be performed every frame, for example.

Next, after N data frames have been sent, the mobile station 102 again sends (at 610) the feedback header of type 0110, followed by another feedback header of type 1101 (at 612).

At some point, the base station 100 can send (at 614) another polling information element, such as Feedback_Polling_IE, to the mobile station 102 to deactivate the closed loop feedback, such that the mobile station 102 no longer sends feedback headers to the base station 100.

Figure 7:
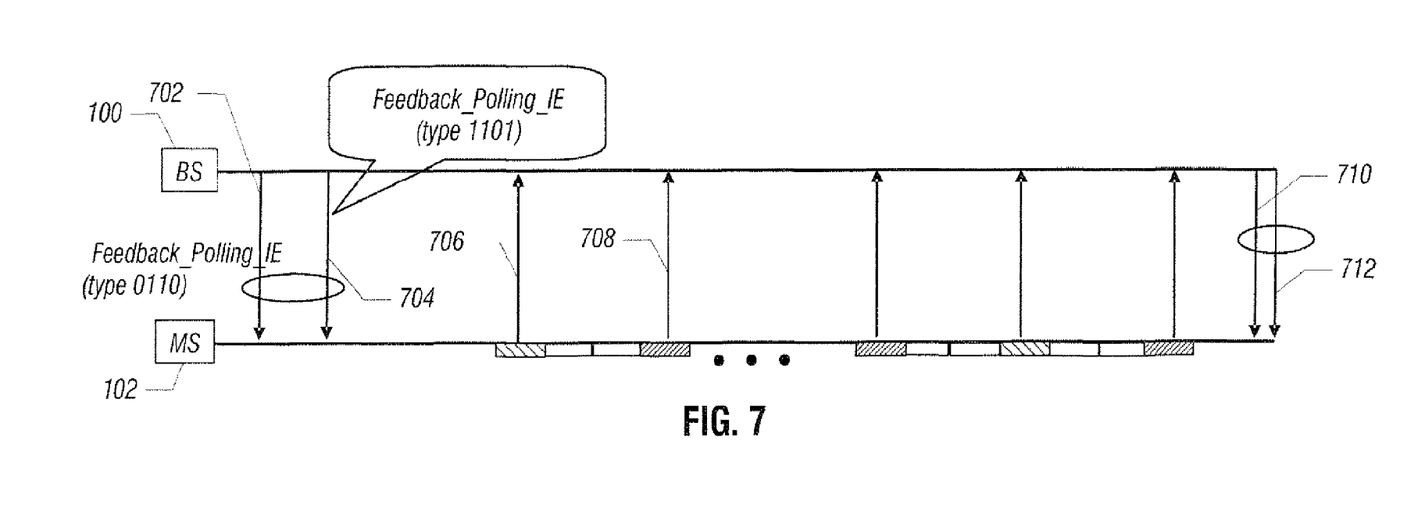

FIG. 7 shows another exemplary flow diagram. In FIG. 7, the base station 100 initiates the feedback mechanism by sending (at 702) a first Feedback_Polling_IE (type 0110) and sending (at 704) another Feedback_Polling_IE (type 1101) to the mobile station 102. In this example, two polling information elements are used instead of just one polling information element in FIG. 6. In this example, in response to the two polling information elements, the mobile station can send the two different types of feedback headers on separate feedback channels.

A feedback header of type 0110 is sent (at 706) by the mobile station 102 to the base station 100. Next, the mobile station 102 sends (at 708) the feedback header of type 1101 to the base station 100. The process continues until the base station 100 sends two polling information elements (at 710, 712) to the mobile station 102 to deactivate the feedback mechanism.

Figure 8:
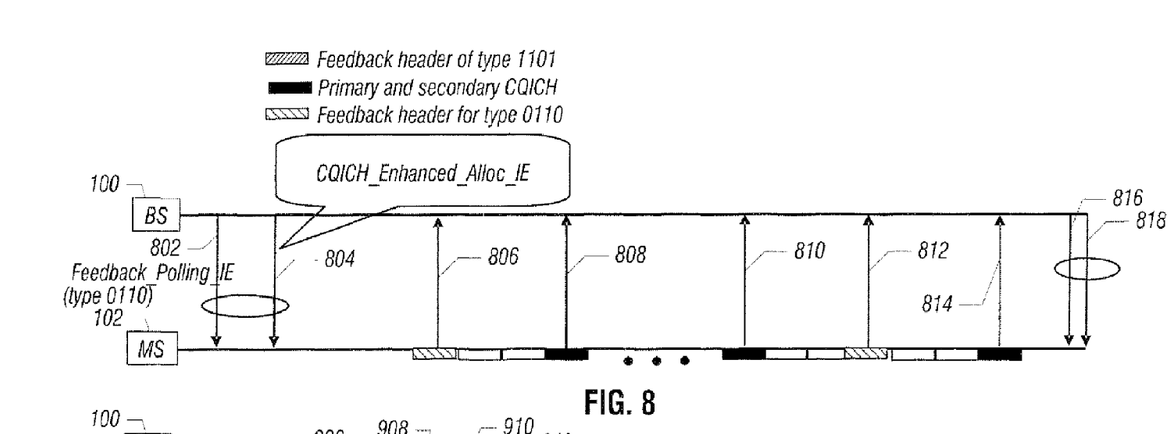

FIG. 8 shows an example of operation in which the base station has decided that the mobile station should report feedback information in the CQICH (primary CQICH and secondary CQICH) instead of using the feedback header of type 1101. In this example, the base station sends (at 802) a Feedback_Polling_IE (type 0110) to the mobile station 102 to instruct the mobile station 102 to send feedback headers of type 0110 on a periodic basis. In addition, the base station 100 also sends (at 804) a CQICH_Enhanced_Alloc_IE to the mobile station 102, where CQICH_Enhanced_Alloc_IE is a polling information element to notify the mobile station to send feedback information in the CQICH instead of the feedback header type 1101.

In response to the information elements, the mobile station sends (at 806) a feedback header of type 0110 to the base station. Next, the mobile station sends (at 808, 810) CQICHs to the base station 102. After N cycles, the mobile station sends (at 812) another feedback header of type 0110, followed by another CQICH (at 814).

At some point, the base station can deactivate the feedback mechanism by sending (at 816, 818) a Feedback_Polling_IE and CQICH_Enhanced_Alloc_IE to the mobile station 102.

Figure 9:
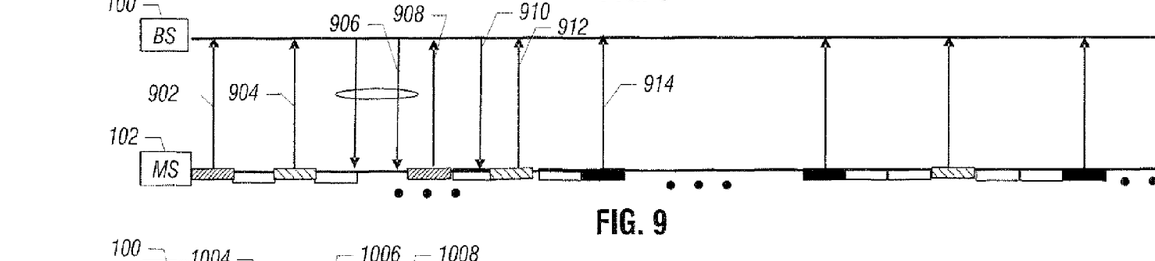

FIG. 9 shows an example of switching between using a feedback header structure of type 1101 and the CQICH to perform the feedback operation when the CL-MIMO operation was started by feedback polling IE for type 1101 only. In the example in FIG. 9, the mobile station sends (at 902) the feedback header of type 1101 to the base station, and next sends (at 904) a feedback header of type 0110 to the base station. Next, the base station sends a Feedback_Polling_IE (type 0110) and CQICH_Enhanced_Alloc_IE (at 906) to the mobile station, which are indications to the mobile station to switch to using CQICH instead of using the feedback header of type 1101. For example, the base station may have detected that the mobile station is in a low SINR (signal-to-interference-noise ratio) region.

Next, the mobile station sends (at 908) a feedback header of type 0110. Then, the base station sends (at 910) a Feedback_Polling_IE to the mobile station to deactivate sending of the feedback header of type 1101. Following this, the mobile station again sends (at 912) a feedback header of type 0110, followed by transmission of CQICH (at 914).

In a different embodiment, when the CL-MIMO operation was started using Feedback_Polling_IEs for types 0110 and 1101, the base station issues a CQICH_Enhanced_Alloc_IE instead of sending (906) the Feedback_Polling_IE (type 0110) to the mobile station to cause a switch to reporting using CQICH, Then Feedback_Polling_IE for type 1101 to deactivate the transmission of feedback header type 1101.

Figure 10:
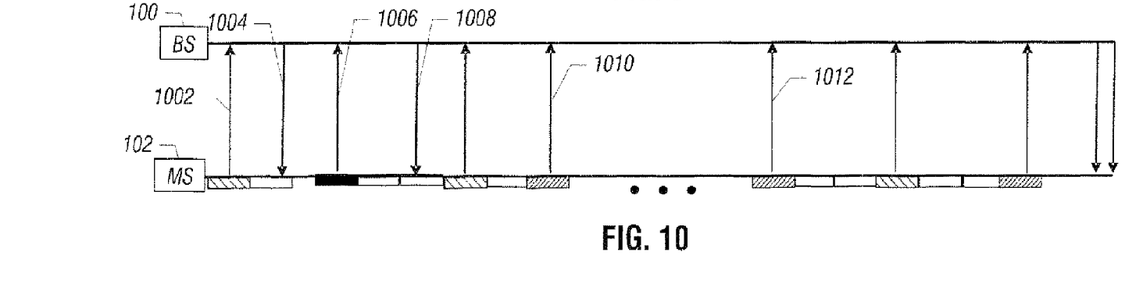

FIG. 10 illustrates switching from using a CQICH to using a feedback header of type 1101 for performing feedback. Initially, the mobile station sends (at 1002) a feedback header of type 0110. Next, the base station detects that the mobile station is in a high SINR region, such that the base station decides to switch the mobile station to feedback using feedback header of type 1101. This is done by sending (at 1004) a Feedback_Polling_IE (type 1101) to the mobile station. However, the mobile station still continues to send (at 1006) the feedback information using CQICH. It is not until the base station has sent (at 1008) the CQICH_Enhanced_Alloc_IE to deactivate the CQICH feedback that the mobile station begins to transmit feedback information using feedback headers of type 1101 (e.g., 1010, 1012).

In the foregoing embodiments, instead of using the feedback header of type 0110, a REP-RSP (Report-Response) message can be used instead to carry to content depicted in FIG. 3. In such an alternative embodiment, the flow diagrams of FIGS. 6-10 would be modified to replace each instance of feedback header of type 0110 with the REP-RSP message.

The sending of polling information elements and feedback information performed by the respective base station and mobile station can be controlled by software. If controlled by software, instructions of such software are executed on a processor (such as CPUs 110 and 118 in FIG. 1). The processor includes microprocessors, microcontrollers, processor modules or subsystems (including one or more microprocessors or microcontrollers), or other control or computing devices. A "processor" can refer to a single component or to plural components (e.g., some CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for operating a first wireless node as part of a closed loop multiple-input multiple-output (MIMO) communication system including the first wireless node and a second wireless node, the method comprising:
   estimating a channel matrix H of a wireless channel from the second wireless node to the first wireless node;
   computing first indicators based on the channel matrix H, wherein the first indicators identify recommended coding for signaling to be transmitted from the second wireless node to the first wireless node, wherein the first indicators include: a precoding matrix indicator (PMI) selected from a set of two or more available PMI values, and a rank mode indicator selected from a set of two or more available rank values, wherein said estimating and said computing are performed by digital circuitry, wherein said computing the first indicators includes:
      computing an objective value for each precoding matrix in a predefined codebook, wherein rows of the codebook correspond to the two or more available PMI values, wherein columns of the codebook correspond to the two or more available rank values; and
      selecting the first indicators based on a maximization of the objective value over the codebook;
   transmitting a feedback data structure over the wireless channel from the first wireless node and to the second wireless node, wherein the feedback data structure includes the first indicators, wherein said transmitting is performed by a wireless interface.

2. The method of claim 1, wherein the feedback data structure includes one or more indicators for each frequency band in a plurality of frequency bands, wherein, for a first of the frequency bands, the one or more corresponding indicators include the first indicators.

3. The method of claim 2, wherein, for each of the frequency bands, the one or more corresponding indicators include:
   a corresponding band-specific PMI value; and
   a corresponding band-specific rank mode indicator.

4. The method of claim 1, wherein the objective value is a value representing channel capacity.

5. The method of claim 1, wherein the set of two or more available rank values includes rank one and rank two.

6. A method for operating a first wireless node as part of a closed loop multiple-input multiple-output (MIMO) communication system including the first wireless node and a second wireless node, the method comprising:
   receiving a feedback data structure that is transmitted over a wireless medium by the second wireless node, wherein the feedback data structure contains first indicators, wherein said receiving is performed by a wireless interface;
   operating, by digital circuitry, on signal data based on coding recommended by the first indicators in order to obtain transmit signals, wherein the first indicators include a precoding matrix indicator (PMI) and a rank mode indicator;
   transmitting, by the wireless interface, the transmit signals to the second wireless node through the wireless medium;
   wherein the first indicators have been determined based on an estimated channel matrix H, wherein the first indicators have been determined at the second wireless node by:
      computing an objective value for each precoding matrix in a predefined codebook, wherein rows of the codebook correspond to two or more available PMI values, wherein columns of the codebook correspond to two or more available rank values; and
      selecting the first indicators based on a maximization of the objective value over the codebook.

7. The method of claim 6, wherein the feedback data structure includes one or more indicators for each frequency band in a plurality of frequency bands, wherein, for a first of the frequency bands, said one or more corresponding indicators include the first indicators.

8. The method of claim 7, wherein, for each of the frequency bands, the one or more corresponding indicators include:
   a corresponding band-specific PMI value; and
   a corresponding band-specific rank mode indicator.

9. The method of claim 6, wherein the objective value is channel capacity.

10. The method of claim 6, wherein the set of two or more available rank values includes rank one and rank two.

11. The method of claim 6, wherein the one or more first indicators include the precoding matrix indicator, wherein the precoding matrix indicator and the rank mode indicator are used by the first wireless node to access a precoding matrix from the predefined codebook, wherein the precoding matrix is used by the first wireless node to precode one or more layers of the signal data to obtain the transmit signals, wherein the transmit signals are transmitted via respective antennas of the first wireless node.

12. A first wireless node for operating as part of a closed loop multiple-input multiple-output (MIMO) communication system including the first wireless node and a second wireless node, the first wireless node comprising:
   digital circuitry configured to:
      estimate a channel matrix H of a wireless channel from the second wireless node to the first wireless node; and
      compute first indicators based on the channel matrix H, wherein the first indicators identify recommended coding for signaling to be transmitted from the second wireless node to the first wireless node, wherein the first indicators include: a precoding matrix indicator (PMI) selected from a set of two or more available PMI values, and a rank mode indicator selected from a set of two or more available rank values, wherein said computing the first indicators includes:
         computing an objective value for each precoding matrix in a predefined codebook, wherein rows of the codebook correspond to the two or more available PMI values wherein columns of the codebook correspond to the two or more available rank values; and
         selecting the first indicators based on a maximization of the objective value over the codebook;
   a wireless interface configured to transmit a feedback data structure over the wireless channel from the first wireless node and to the second wireless node, wherein the feedback data structure includes the first indicators, wherein said transmitting is performed by a wireless interface.

13. The first wireless node of claim 12, wherein the feedback data structure includes one or more indicators for each frequency band in a plurality of frequency bands, wherein, for a first of the frequency bands, the one or more corresponding indicators include the first indicators.

14. The first wireless node of claim 13, wherein, for each of the frequency bands, the one or more corresponding indicators include:
   a corresponding band-specific PMI value; and
   a corresponding band-specific rank mode indicator.

15. The first wireless node of claim 12, wherein the objective value is a value representing channel capacity.

16. A first wireless node for operating as part of a closed loop multiple-input multiple-output (MIMO) communication system including the first wireless node and a second wireless node, the first wireless node comprising:
   digital circuitry configured to:
      receive a feedback data structure that is transmitted over a wireless medium by the second wireless node, wherein the feedback data structure contains first indicators;
      operate on signal data based on coding recommended by the first indicators in order to obtain transmit signals, wherein the first indicators include: a precoding matrix indicator (PMI) and a rank mode indicator;
   a wireless interface configured to transmit the transmit signals to the second wireless node through the wireless medium;
   wherein the first indicators have been determined based on an estimated channel matrix H, wherein the first indicators have been determined at the second wireless node by:
      computing an objective value for each precoding matrix in a predefined codebook, wherein rows of the codebook correspond to two or more available PMI values, wherein columns of the codebook correspond to two or more available rank values; and
      selecting the first indicators based on a maximization of the objective value over the codebook.

17. The first wireless node of claim 16, wherein the feedback data structure includes one or more indicators for each frequency band in a plurality of frequency bands, wherein, for a first of the frequency bands, said one or more corresponding indicators include the first indicators.

18. The first wireless node of claim 17, wherein, for each of the frequency bands, the one or more corresponding indicators include:
   a corresponding band-specific PMI value; and
   a corresponding band-specific rank mode indicator.

19. The first wireless node of claim 16, wherein the objective value is channel capacity.

20. A non-transitory memory medium for operating a first wireless node as part of a closed loop multiple-input multiple-output (MIMO) communication system including the first wireless node and a second wireless node, wherein the memory medium stores program instructions, wherein the program instructions, when executed by a processor, cause the processor to:
   estimate a channel matrix H of a wireless channel from the second wireless node to the first wireless node;
   compute first indicators based on the channel matrix H, wherein the first indicators identify recommended coding for signaling to be transmitted from the second wireless node to the first wireless node, wherein the first indicators include: a precoding matrix indicator (PMI) selected from a set of two or more available PMI values, and a rank mode indicator selected from a set of two or more available rank values, wherein said estimating and said computing are performed by digital circuitry, wherein said computing the first indicators includes:
      computing an objective value for each precoding matrix in a predefined codebook, wherein rows of the codebook correspond to the two or more available PMI values, wherein columns of the codebook correspond to the two or more available rank values; and
      selecting the first indicators based on a maximization of the objective value over the codebook.

21. The memory medium of claim 20, wherein the feedback data structure includes one or more indicators for each frequency band in a plurality of frequency bands, wherein, for a first of the frequency bands, the one or more corresponding indicators include the first indicators.

22. The memory medium of claim 21, wherein, for each of the frequency bands, the one or more corresponding indicators include:
   a corresponding band-specific PMI value; and
   a corresponding band-specific rank mode indicator.

23. The memory medium of claim 20, wherein the objective value is a value representing channel capacity.

24. A non-transitory memory medium for operating a first wireless node as part of a closed loop multiple-input multiple-output (MIMO) communication system including the first wireless node and a second wireless node, wherein the memory medium stores program instructions, wherein the program instructions, when executed b a processor, cause the processor to:
   receive a feedback data structure that is transmitted over a wireless medium by the second wireless node, wherein the feedback data structure contains first indicators;

operating on signal data based on coding recommended by the first indicators in order to obtain transmit signals, wherein the first indicators include: a precoding matrix indicator (PMI) and a rank mode indicator; and transmit the transmit signals to the second wireless node through the wireless medium;

wherein the first indicators have been determined based on an estimated channel matrix H, wherein the first indicators have been determined at the second wireless node by:

computing an objective value for each precoding matrix in a predefined codebook, wherein rows of the codebook correspond to two or more available PMI values, wherein columns of the codebook correspond to two or more available rank values; and     selecting the first indicators based on a maximization of the objective value over the codebook.

25. The memory medium of claim 24, wherein the feedback data structure includes one or more indicators for each frequency band in a plurality of frequency bands, wherein, for a first of the frequency bands, said one or more corresponding indicators include the first indicators.

26. The memory medium of claim 25, wherein, for each of the frequency bands, the one or more corresponding indicators include:

a corresponding band-specific PMI value; and a corresponding band-specific rank mode indicator.

27. The memory medium of claim 24, wherein the objective value is channel capacity.

28. The method of claim 1, wherein the predefined codebook is stored in the first wireless node, wherein the predefined codebook is also stored in the second wireless node.

29. The method of claim 1, wherein the first indicators also include a channel quality indicator (CQI).

30. The method of claim 6, wherein the predefined codebook is stored in the first wireless node, wherein the predefined codebook is also stored in the second wireless node.

31. The method of claim 6, wherein the first indicators also include a channel quality indicator (CQI).

32. The first wireless node of claim 16, wherein the predefined codebook is stored in the first wireless node, wherein the predefined codebook is also stored in the second wireless node.

\* \* \* \* \*